United States Patent
Hsu

(10) Patent No.: US 7,556,882 B2
(45) Date of Patent: Jul. 7, 2009

(54) IMPACT RESISTANT BATTERY HOUSING WITH COVER

(75) Inventor: Wen-Hua Hsu, Forest Hills, NY (US)

(73) Assignee: Honeywell International Inc., Morristown, NJ (US)

( * ) Notice: Subject to any disclaimer, the term of this patent is extended or adjusted under 35 U.S.C. 154(b) by 836 days.

(21) Appl. No.: 10/923,245

(22) Filed: Aug. 20, 2004

(65) Prior Publication Data

US 2006/0040172 A1 Feb. 23, 2006

(51) Int. Cl.
*H01M 2/10* (2006.01)
(52) U.S. Cl. .............................. 429/96; 429/100; 429/97
(58) Field of Classification Search .................. 429/96, 429/99, 100, 97; 206/703
See application file for complete search history.

(56) References Cited

U.S. PATENT DOCUMENTS

2005/0042502 A1* 2/2005 Becker ......................... 429/99
2005/0191544 A1* 9/2005 Casanova .................... 429/100

* cited by examiner

*Primary Examiner*—Raymond Alejandro
(74) *Attorney, Agent, or Firm*—Husch Blackwell Sanders Welsh & Katz

(57) ABSTRACT

A battery housing unit with a releasable cover for minimizing mis-alignment of a battery housed therein during high impact loads. The battery unit includes a battery holder having retention members biased towards one another that receive a battery. The retention members engage stop ribs projecting from the cover. The cover fits over the retention members of the battery holder and to a base of the housing unit. The retention members and stop ribs are engaged when high impact loads are delivered to the housing unit and the battery is urged against the biasing nature of the retention members. Movement and mis-alignment of the battery is thus minimized and high impact loads are re-distributed throughout the cover. Detents may be provided on each retention member for engaging a corresponding cavity provided on each stop rib. The detents and cavities interlock the retention members and stop ribs together upon high impact. In this manner, movement and mis-alignment of the battery is also minimized.

21 Claims, 9 Drawing Sheets

IMPACT RESISTANT BATTERY HOUSING WITH COVER

BACKGROUND OF THE INVENTION

1. Field of the Invention

The invention generally relates to systems and methods for providing an impact resistant battery housing. More specifically, the invention relates to systems and methods for providing an impact resistant battery housing with a lightweight cover that helps maintain a battery in a desired position within the battery housing while minimizing the effects of high impact loads delivered to the housing.

2. Related Art

Battery housing units for retaining a battery in place are widely known. Ideally, the housing units retain the battery in a position whereby leads at ends of the battery are aligned with contacts provided on a device to be powered by the battery. Preferably, this alignment of the battery is maintained even when the device or housing unit is subjected to high impact loads. Such high impact loads may occur during product testing, such as UL 636 jarring tests, or in the case of door or window mounted transmitters, for example, during the slamming of the door the transmitter is mounted upon. Often such high impact loads cause a battery to shift at least partially out of alignment with the contacts of the device that is to be powered by the battery. As a result, failure of the device intended to be powered by the battery, such as a transmitter, may occur.

Housing unit covers have been developed to help retain batteries in alignment with the contacts of a device notwithstanding impacts to the device or the housing unit. Such covers often use screws, heavier materials, snaps or other structures such as biasing members to secure the cover to the housing unit and retain the battery in place within the housing unit. While aiding retention of the battery in a desired position, such covers often render replacement of a battery more difficult due to the heavier materials, additional structures or screws used to comprise the cover and housing unit.

In view of the above, a need exists for a battery housing unit that retains a battery in alignment with contacts of the device to be powered by the battery while minimizing the effect of high load impacts on the device or housing unit using a lightweight cover fitted over the battery holder and to the housing unit. A need further exists for a battery housing unit having a cover that renders access to the battery compartment and/or replacement of an expired battery convenient by easy removal of the cover from the housing unit.

SUMMARY OF THE INVENTION

The systems and methods according to the invention provide a battery housing unit comprised of a battery holder and cover that minimizes mis-alignment of a battery within the housing unit even when high impact loads are delivered to the housing unit.

According to the systems and methods of the invention, the battery holder is comprised of a base having an interior surface, an exterior surface, and a plurality of sides connecting the interior and exterior surfaces. At least one pair of flexible retention members project from the interior surface of the base and receive the battery therebetween. Contact ends are provided to also receive the battery in conventional manner. Each retention member is further comprised of an inner surface and an outer surface, whereby the battery is received between the inner surfaces of the retention members. Detents may be provided to project from the outer surface of each retention member for engagement with cavities that may be provided in stop ribs of the cover as discussed further below. Each retention member is biased towards the other retention member of the pair of retention members it belongs to, the biasing nature of each pair of retention members helping to align and secure the battery seated therebetween, wherein aligning the battery comprises aligning ends of the battery with the contact ends in a device to be powered by the battery.

The artisan will appreciate that the retention members and contact ends may be oriented and spaced apart a distance and may extend a length sufficient to hold a single battery, or may be oriented and spaced apart a distance and may extend a length sufficient to hold two or more batteries arranged in parallel or in series relative to one another.

According to the systems and methods of the invention, the cover is of a size and shape that generally corresponds to fit over the battery holder and to the base of the housing unit. The cover is comprised of an interior surface, an exterior surface, and a plurality of sides connecting the interior and exterior surfaces thereof. Semi-rigid stop ribs project from the interior surface of the cover and fit over an outer surface of the retention members when the cover is closed over the battery holder and fitted to the base of the housing unit. Each stop rib of the cover may further include a cavity that is engagable by a corresponding detent, where provided, of one of the retention members.

In some embodiments of the invention, the cover slides and snaps over the plurality of sides of the base, whereas in other embodiments of the invention the cover hingedly engages one of the plurality of sides of the base of the housing unit and slides and snaps over the remaining of the plurality of sides of the base.

In practice, according to the systems and methods of the invention, the cavity of each stop rib is engaged by a corresponding detent, where provided, of one of the retention members when a high impact load delivered to the housing unit urges the battery against the biasing tendency of the retention members. Because the detents engage the cavities, the cover is retained over the battery holder and effectively locks the battery in place to minimize further movement of the battery notwithstanding the high impact load. On the other hand, even where the cavities and detents are not provided, the combination of the stop ribs and retention members cooperate to amply retain the battery or batteries in place. As a result, mis-alignment of the battery is minimized even during high impact loads when the cover is fitted over the battery holder and to the base of the housing unit. High impact loads delivered to the housing unit are thus largely absorbed by the stop ribs locked with the retention members and re-distributed throughout the cover through elastic distortion.

The battery holder is molded, or otherwise incorporated, onto the base of the housing unit. The base and battery holder may be comprised of plastic, or other lightweight materials. The cover may be comprised of lightweight materials similar to, or other than, the materials that comprises the base and battery holder. Because of the lightweight materials used, removal of the cover for access to the battery holder or to replace an expired battery is relatively easily achieved as well.

The above and other features of the invention, including various novel details of construction and combinations of parts, will now be more particularly described with reference to the accompanying drawings and claims. It will be understood that the various exemplary embodiments of the invention described herein are shown by way of illustration only and not as a limitation thereof. The principles and features of this invention may be employed in various alternative embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Figure 1:
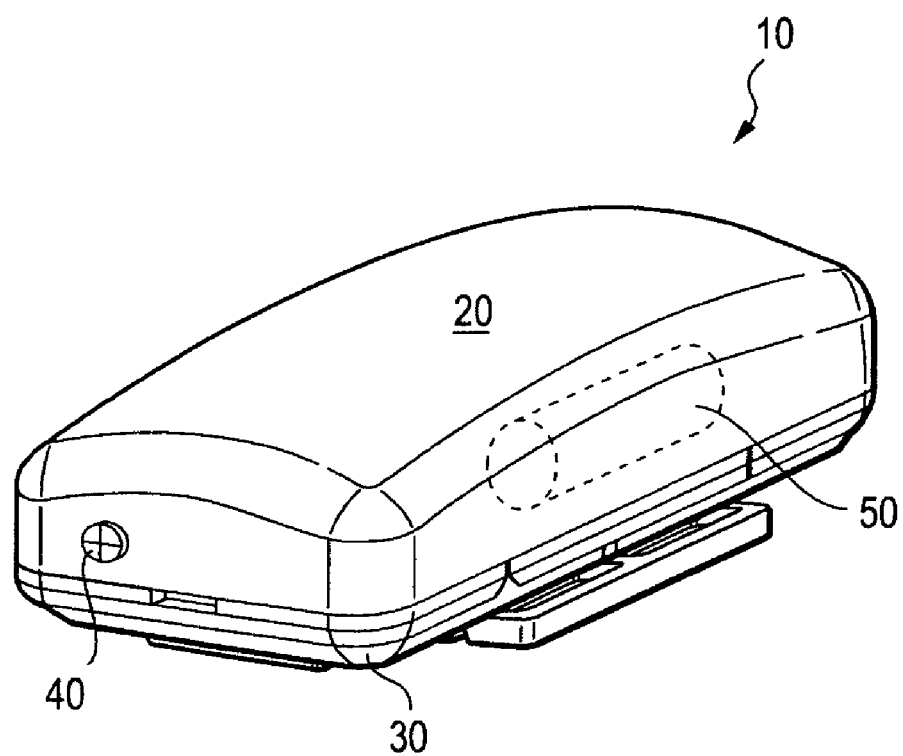
FIG. 1 illustrates a prior art device using screws to secure a cover to a base of a battery housing unit.

FIG. 1 illustrates an exemplary prior art battery housing unit 10 whereby a cover 20 is secured to a base 30 by screws 40 penetrating through corners of the cover 20 and into the base 30. A battery 50 (shown in dashed lines) is housed between the base 30 and cover 20. The screws 40 retain the cover 20 in fitting relation with the base 30 so that the battery is maintained therebetween even during high impact loads. In the absence of the screws, the cover 20 would likely separate from the base 30 upon delivery of a high impact load to the housing unit.

Figure 2:
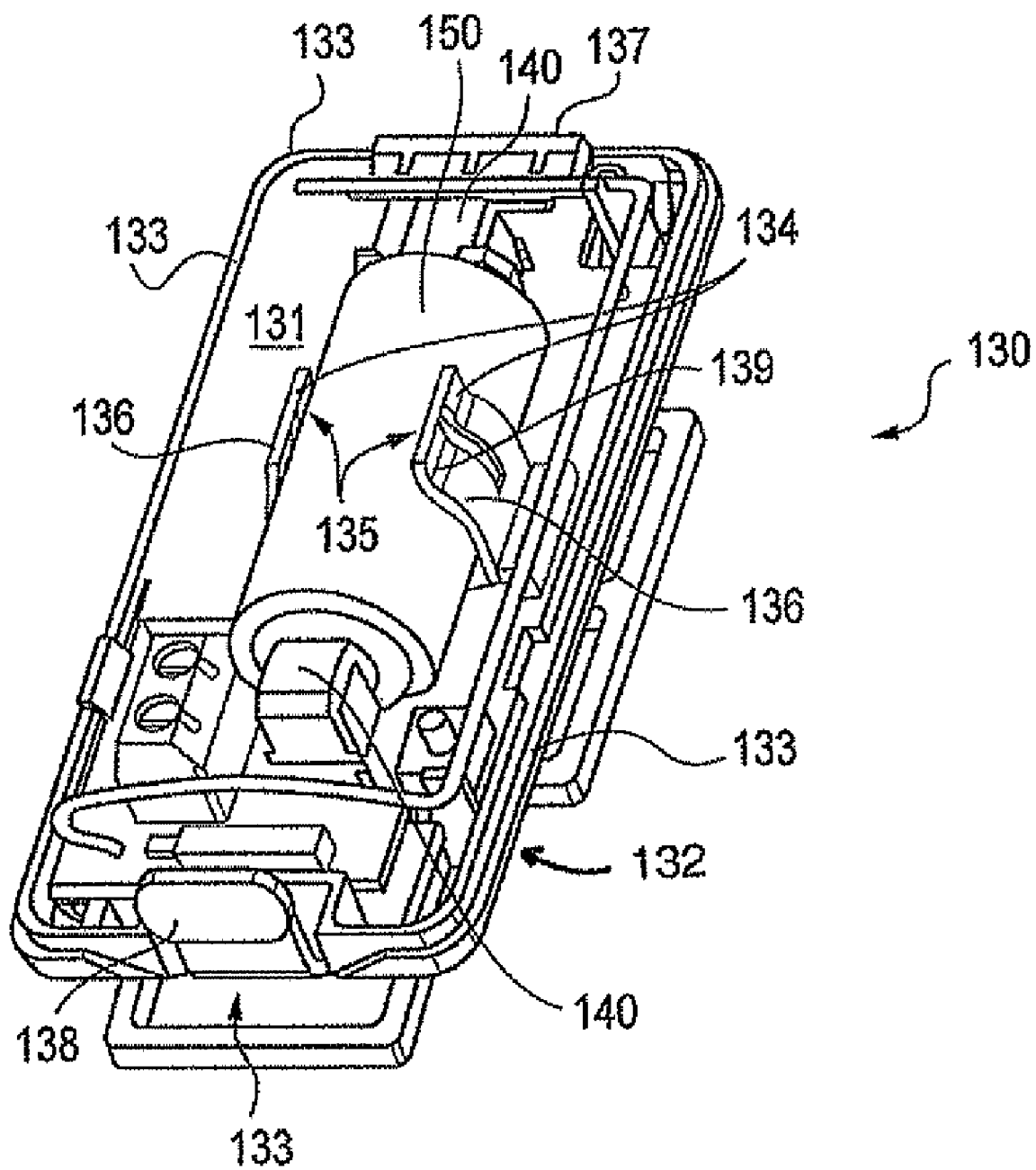
FIG. 2 illustrates a base of a battery housing unit according to one embodiment of the invention.

FIG. 2 illustrates a base 130 of a housing unit according to one exemplary embodiment of the invention. As shown in FIG. 2, the base 130 comprises an interior surface 131, an exterior surface 132 (not shown) opposite the interior surface 131, and a plurality of sides 133 connecting the interior and exterior surfaces. At least one pair of flexible retention members 134 project from the interior surface 131 of the base 130 and receive the battery 150 therebetween. The retention members 134 may be integrally molded with the base 130, or may be separately attached to the base 130. Each retention member 134 is further comprised of an inner surface 135 and an outer surface 136, whereby the battery 150 is received between the inner surfaces 135 of the retention members 134. The battery 150 is also positioned between opposed contact ends 140 in conventional manner. A groove 137 extends along one of the sides 133 of the base 130 for receipt of a contoured end 125 at one side 123 of the cover 120, and a flexible button 138 projects from another of the sides 133 for receipt within an opening 126 at another of the sides 123 of the cover 120 when the cover is fitted over the base 130. Where provided, detents 139 project from the outer surface 136 of each retention member 134 for engagement with cavities 127 provided in stop ribs 124 of the cover 120 as discussed further below. Each retention member 134 is biased towards the other retention member 134 of the pair of retention members it belongs to, the biasing nature of each pair of retention members helping to secure the battery 150 seated therebetween.

Although the base 130 is shown in FIG. 2 as generally rectangularly shaped, the artisan will appreciate that other shapes and sizes are readily available within the context of a battery housing unit according to the invention. The artisan will further appreciate as shown in FIG. 2, that the retention members may be spaced apart a distance and may extend a length sufficient to hold a single battery, or may be spaced apart a distance and may extend a length sufficient to hold two or more batteries arranged in series or in parallel relative to one another as shown in FIGS. 8a-8c or FIGS. 9a-9c, respectively. The artisan will also appreciate that although the battery is shown as generally centrally positioned between the base and cover in the embodiments illustrated in the FIGS. 1-8, the position of the battery may be re-oriented by re-orienting the retention members on the base 130. Likewise, the artisan will appreciate that various sized batteries may be positioned between the base and cover according to the orientation of the retention members and contact ends.

Figure 3:
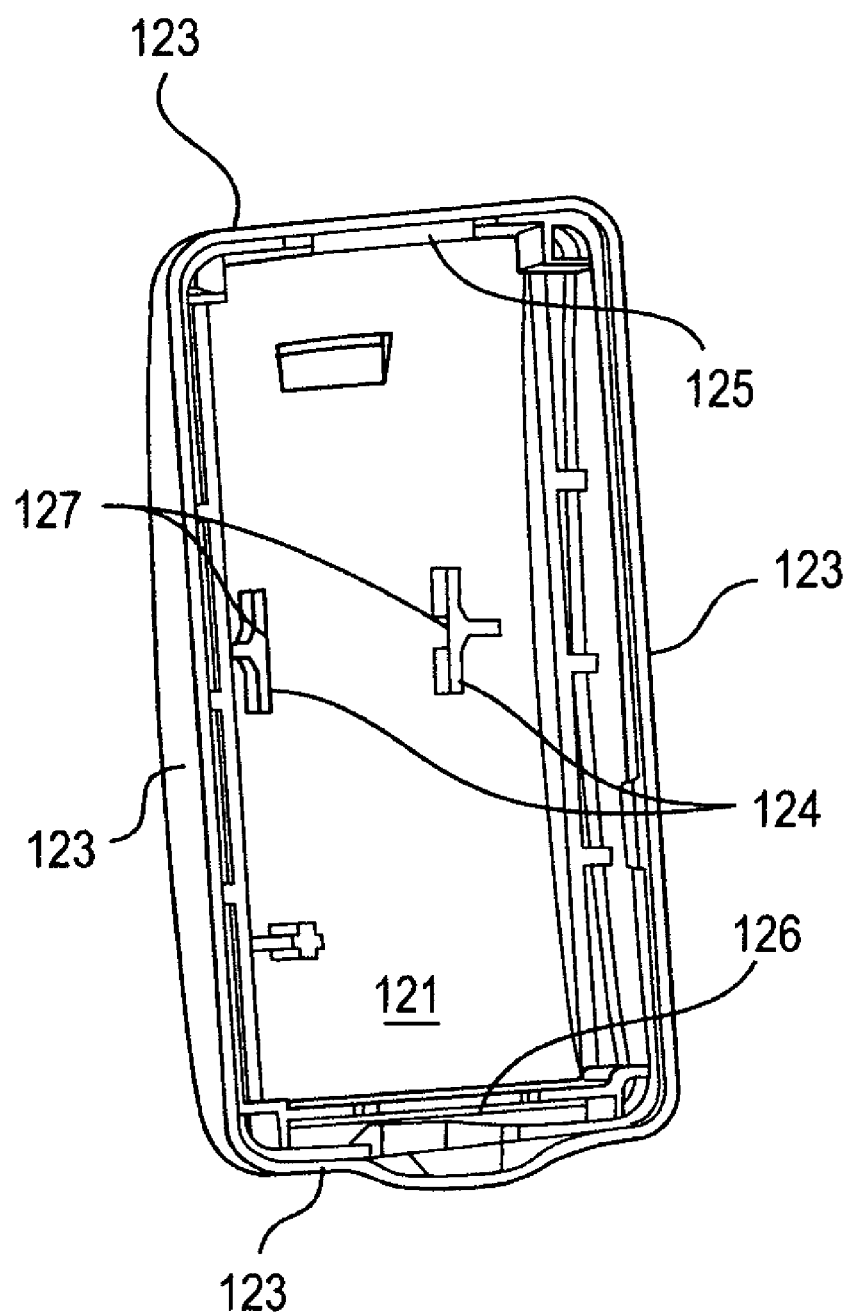
FIG. 3 illustrates a cover for fitting over the base of FIG. 2 according to the invention.

FIG. 3 illustrates a cover 120 for fitting over the base 130 shown in FIG. 2 according to the invention. As shown in FIG. 3, the cover 120 is comprised of an interior surface 121, an exterior surface 122 (FIG. 4) opposite the interior surface 121, and a plurality of sides 123 connecting the interior and exterior surfaces thereof. Semi-rigid stop ribs 124 project from the interior surface 121 of the cover 120 and fit over an outer surface 136 of the retention members 134 of the base 130 when the cover 120 is fitted over the battery 150 and to the base 130 of the housing unit. The stop ribs 124 may be molded integrally with, or may be separately attached to, the cover 120. One of the sides 123 of the cover includes a contoured tab 125 that snap-fits within the groove 137 of the base, and another of the sides 123 of the cover includes an opening 126 that receives the flexible button 138 of the base 130, when the cover 120 is fitted over the base 130. The tab 125 received in the groove 137 of the base hingedly supports the cover 120 relative to the base 130 for positioning the cover as desired, such as for opening the cover 120 to access the battery 150, for example. Each stop rib 124 of the cover 120 may include a cavity 127 that is engageable by a corresponding detent 139, where provided, of one of the retention members 134 when the cover 120 is fitted over the base 130.

Figure 4:
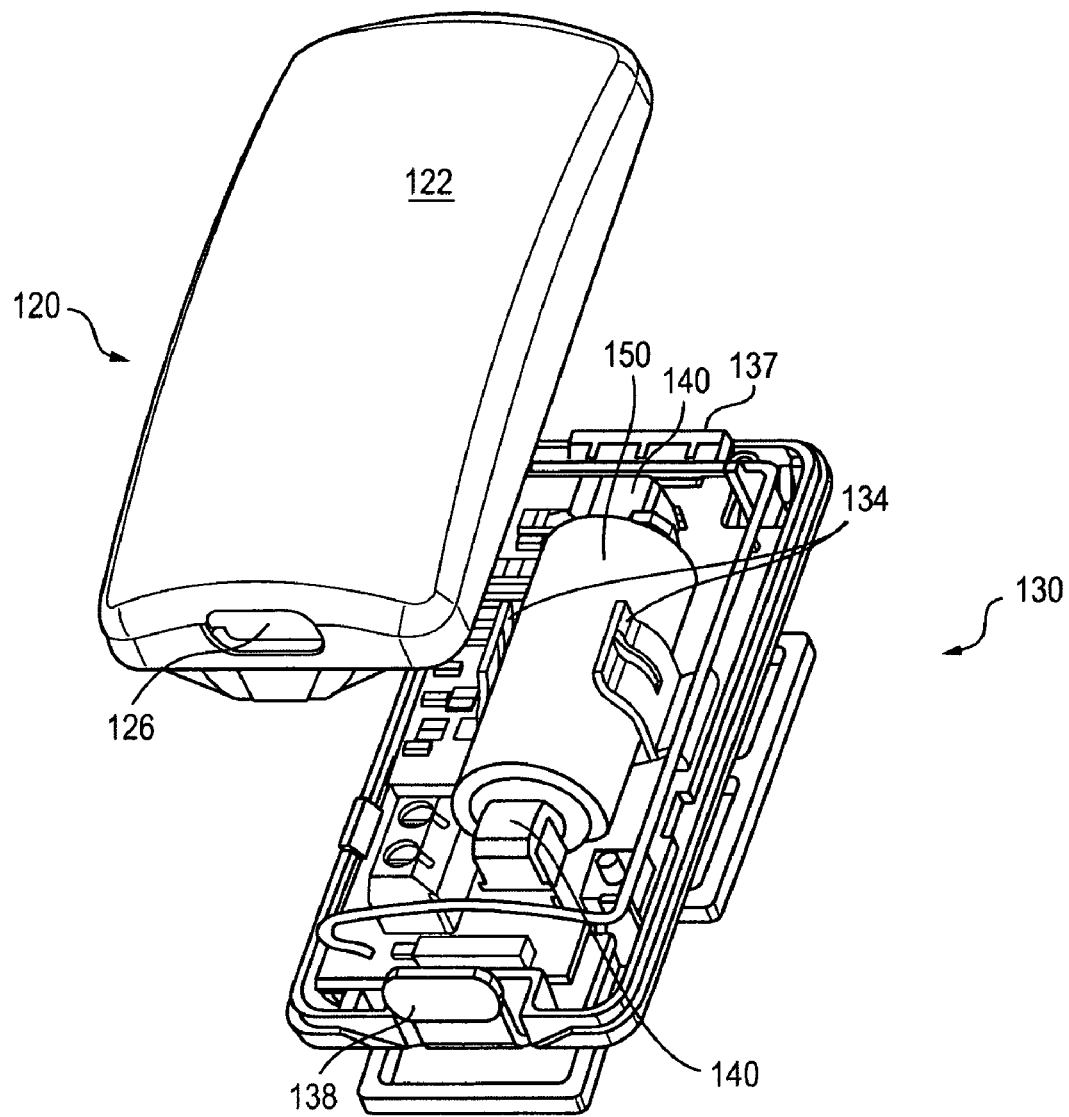
FIG. 4 illustrates a front view of the cover of FIG. 3 aligned for fitting with the base of FIG. 2.
Figure 5:
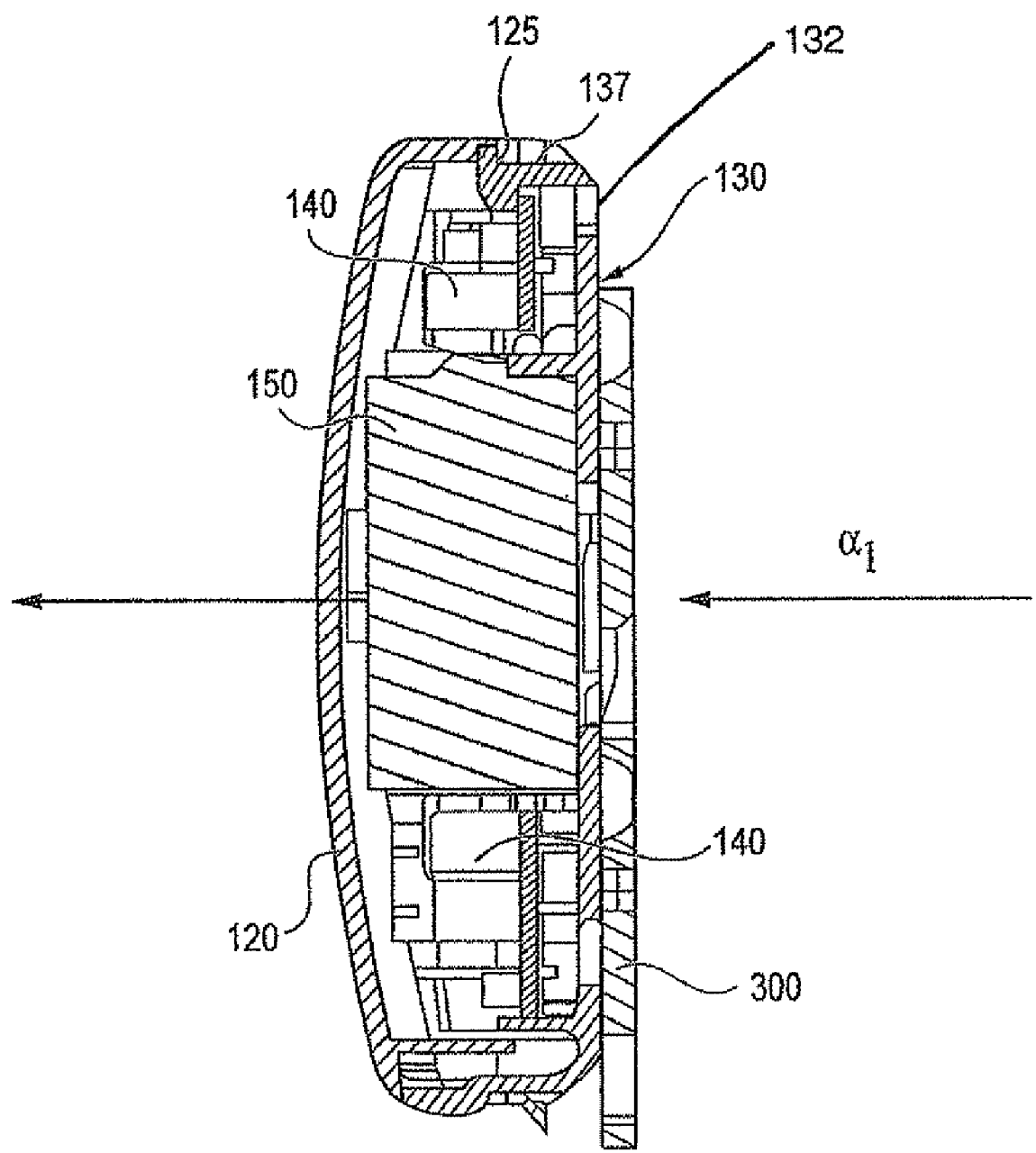
FIG. 5 illustrates in cross section the cover of FIG. 3 fitted to the base of FIG. 2 and the distribution tendencies of high impact loads.

FIG. 4 shows the cover 120 of FIG. 3 aligned for fitting with the base 130 of FIG. 2, and FIG. 5 shows, in cross-section, the cover 120 of FIG. 3 fitted to the base 130 of FIG. 2 to form a battery housing unit according to the invention. The base may be mounted to a door 300, window, or other surface, for example, as shown in FIG. 5. FIG. 5 also shows a sample of the distribution of impact as a result of the housing unit according to the invention wherein the cavity 127 of each stop rib 124 is engaged by a corresponding detent 139 of one of the retention members 134 when a high impact load is delivered to the housing unit in the direction shown by arrow $a_1$. The direction $a_1$ of the high impact load urges the battery 150 against the biasing tendency of the retention members 134. Because the detents 139 engage the cavities 127, the cover 120 is retained over the base and effectively locks the battery 150 in place notwithstanding the high impact load. As a result, mis-alignment of the battery 150 is minimized even during high impact loads. High impact loads delivered to the housing unit are thus largely absorbed by the stop ribs 124 locked with the retention members 134 and re-distributed throughout the cover 120 through elastic distortion.

Figure 6:
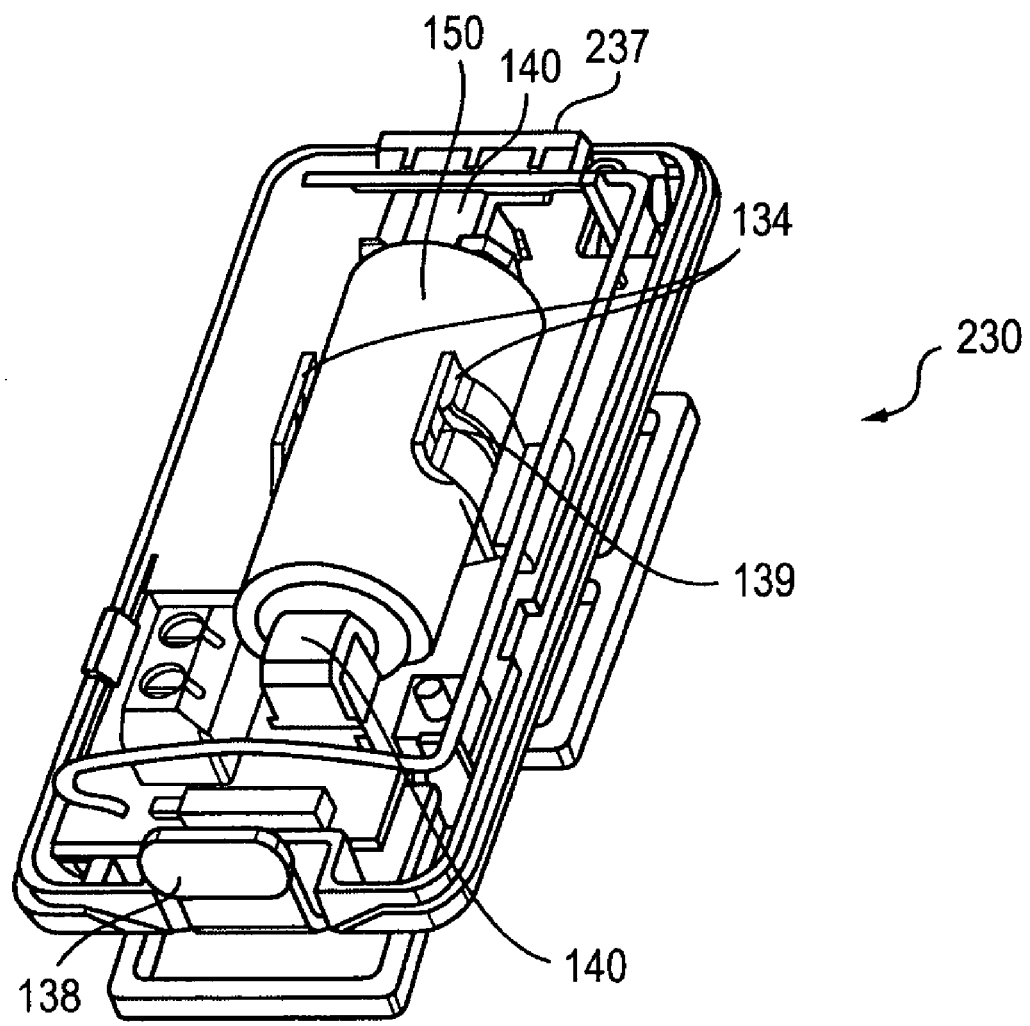
FIG. 6 illustrates another embodiment of a base according to the invention.
Figure 7:
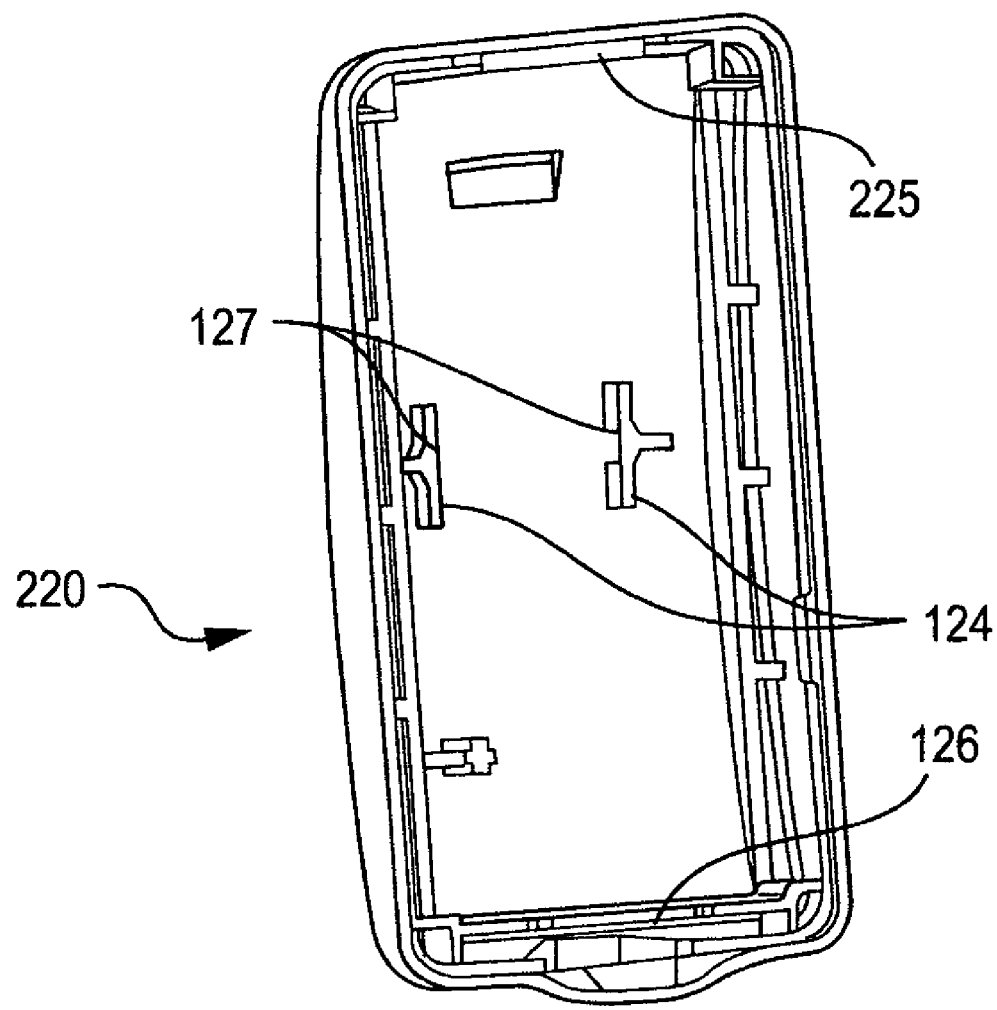
FIG. 7 illustrates another cover for fitting over the base of FIG. 6 according to the invention.

FIG. 6 and FIG. 7 illustrate another embodiment of a base 230 and cover 220 according to the invention, wherein like parts are identified by like reference numerals as compared to earlier described embodiments of the invention. The base 230 shown in FIG. 6 is similar to the base 130 shown in FIG. 2 in all respects except that the groove 137 of base 130 is replaced with a semi-rigid tab 237 in base 230. The cover 220 shown in FIG. 7 is similar to the cover 120 shown in FIG. 3 in all respects except that the tab 125 is replaced with a slotted opening 225. The semi-rigid tab 237 of the base 230 is thus designed to comply with and be received by the slotted opening 225 of the cover 220 in order to fit the cover 220 to the base 230 otherwise similarly as to that shown in FIGS. 4 and 5.

Figure 8A:
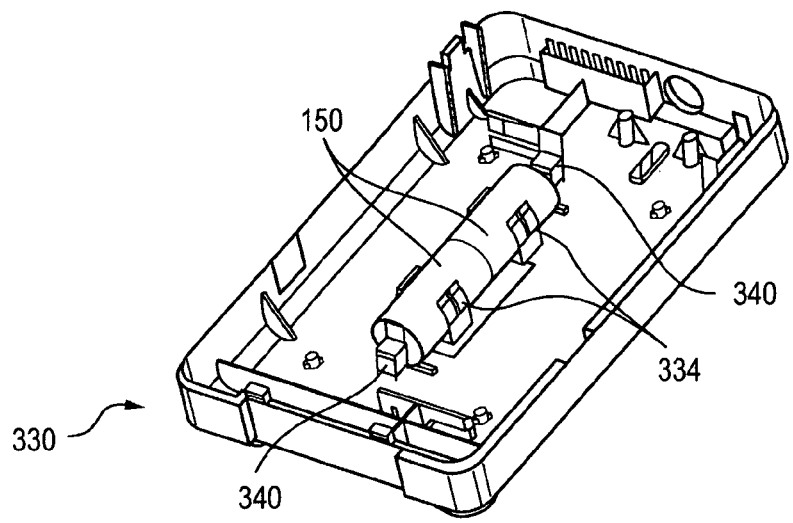
FIGS. 8a-8c illustrate an arrangement of batteries in series within a housing unit according to the systems and methods of the invention.
Figure 8B:
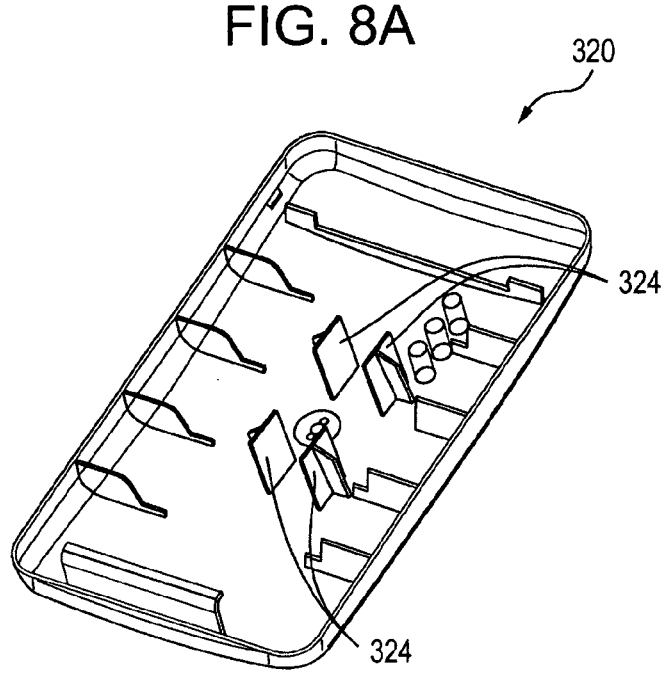
Figure 8C:
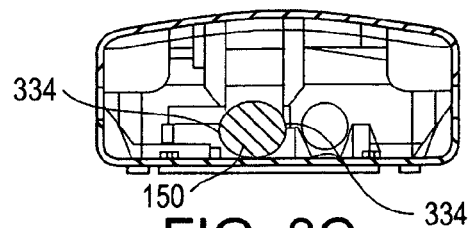

FIGS. 8a-8c illustrate another embodiment of the base 330 and cover 320 according to the invention, wherein the batteries 150 are arranged in series between re-oriented retention members 334 and contact ends 340, as shown most clearly in FIG. 8a. FIG. 8b shows the stop ribs 324 of the cover 320 oriented to accommodate the re-oriented retention members 334 and contact ends 340 of FIG. 8a. FIG. 8c shows a cross-sectional view of the batteries 150 arranged in series according to this embodiment. All other aspects of the embodiments shown in FIGS. 8a-8c are generally the same as shown in either of the embodiments shown in FIGS. 2-7, wherein reference numerals are omitted for like parts.

Figure 9A:
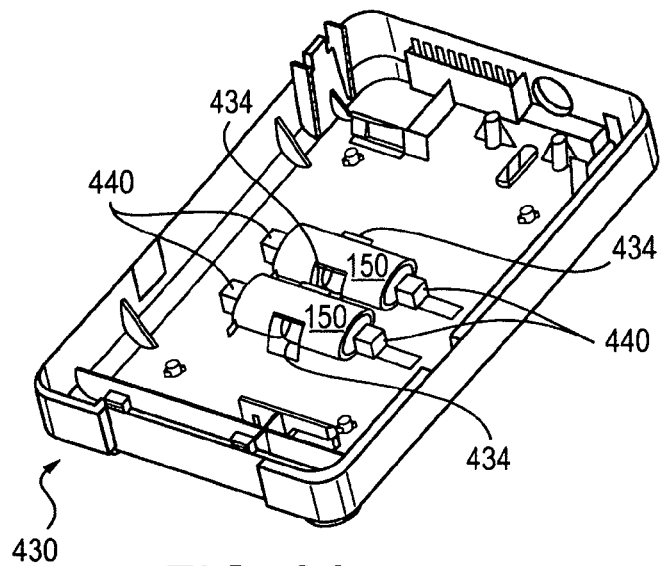
FIGS. 9a-9c illustrate another arrangement of batteries in parallel within a housing unit according to the systems and methods of the invention.
Figure 9B:
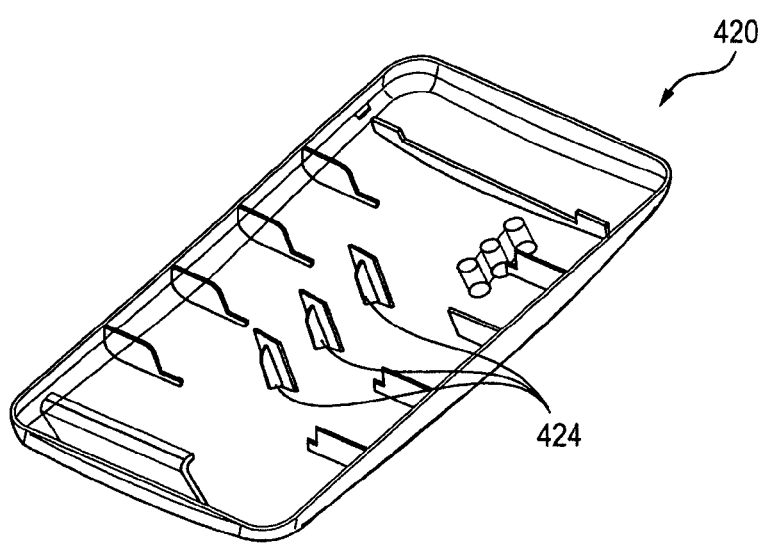
Figure 9C:
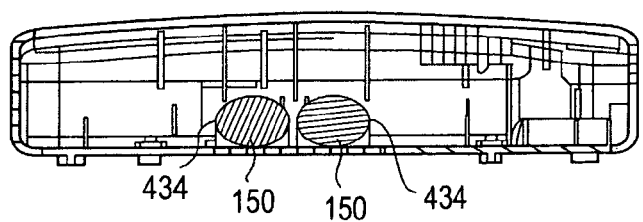

FIGS. 9a-9c illustrate another embodiment of the base 330 and cover 320 according to the invention, wherein the batteries 150 are arranged in parallel between re-oriented retention members 434 and contact ends 440, as shown most clearly in FIG. 9a. FIG. 9b shows the stop ribs 424 of the cover 420 oriented to accommodate the re-oriented retention members 434 and contact ends 440 of FIG. 9a. FIG. 9c shows a cross-sectional view of the batteries 150 arranged in series according to this embodiment. All other aspects of the embodiments shown in FIGS. 9a-9c are generally the same as shown in either of the embodiments shown in FIGS. 2-7, wherein reference numerals are omitted for like parts.

The artisan will readily appreciate that although only two batteries 150 are shown in series or in parallel in the embodiments illustrated in FIGS. 8a-8c and FIGS. 9a-9c, respectively, more than two batteries may be retained within the battery housing unit according to the systems and methods of the invention by duplicating at least the retention members, contact ends and stop ribs as otherwise described herein to accommodate additional batteries. The batteries can be of various sizes known in the art provided the retention members, contact ends and stop ribs are oriented, spaced and sized appropriately as should be readily evident and understood by the artisan based on the description herein.

The battery holder retention members may be integrally molded with, or otherwise attachedly incorporated onto, the base of the housing unit according to the systems and methods of the invention. The base and battery holder retention members may be comprised of plastic, spring steel, a combination thereof, or other individual or combined lightweight materials known in the art. The cover may be comprised of lightweight materials similar to, or other than, the materials that comprises the base and battery holder. The stop ribs may be similarly integrally molded with, or otherwise attachedly incorporated onto, the cover. Because of the lightweight materials used, removal of the cover for access to the battery holder or to replace an expired battery is relatively easily achieved as well.

The various exemplary embodiments of the invention as described hereinabove do not limit different embodiments of the present invention. The material described herein is not limited to the materials, designs, or shapes referenced herein for illustrative purposes only, and may comprise various other materials, designs or shapes suitable for the systems and procedures described herein as should be appreciated by one of ordinary skill in the art.

While there has been shown and described what is considered to be preferred embodiments of the invention, it will, of course, be understood that various modifications and changes in form or detail could readily be made without departing from the spirit or scope of the invention. It is therefore intended that the invention be not limited to the exact forms described and illustrated herein, but should be construed to cover all modifications that may fall within the scope of the appended claims.

What is claimed is:

1. A battery housing unit for holding at least one battery in a desired position within the housing unit even when subjected to high impact loads, the battery housing unit comprising:
   a base;
   a cover;
   at least one pair of flexible retention members projecting from the base;
   at least one pair of electrical contact ends projecting from the base; and
   at least one pair of stop ribs projecting from the cover, wherein the cover is fitted to the base, and the cover and base substantially enclose the at least one battery, the flexible retention members, the electrical contacts and the stop ribs, where the flexible retention members project from the base substantially to the fitted cover, where each of the at least one battery in a longitudinal direction is retained between the electrical contact ends and in a crossway direction between the flexible retention members and where the stop ribs engage the flexible retention members adjacent the cover and from a side of the flexible retention member opposite the battery.

2. The battery housing unit of claim 1, wherein the base further comprises an interior surface, an exterior surface, and a plurality of sides connecting the interior and exterior surfaces of the base.

3. The battery housing unit of claim 2, wherein the cover further comprises an interior surface, an exterior surface, and a plurality of sides connecting the interior and exterior surfaces of the cover.

4. The battery housing unit of claim 3, wherein each retention member of the at least one pair of retention members further comprises an inner surface and an outer surface, and a detent projecting from an outer surface of each of the retention members.

5. The battery housing unit of claim 4, wherein the battery is received between the inner surfaces of the retention members.

6. The battery housing unit of claim 5, wherein each retention member of the at least one pair of retention members is paired such that the inner surface of one of the retention members is biased towards the inner surface of the other retention member of the at least one pair of retention members, the biasing of the paired retention members helping to secure the battery between said at least one pair of retention members.

7. The battery housing unit of claim 6, wherein the at least one pair of retention members hold a single battery therebetween.

8. The battery housing unit of claim 6, wherein the at least one pair of retention members holds a plurality of batteries therebetween.

9. The battery housing unit of claim 8, wherein the at least one pair of retention members includes multiple pairs of retention members that hold the plurality of batteries in series.

10. The battery housing unit of claim 8, wherein the at least one pair of retention members includes multiple pairs of retention members that hold the plurality of batteries in parallel.

11. The battery housing unit of claim 6, wherein the base further comprises a groove along one side of the plurality of sides of the base, and a flexible button at an opposite side of the plurality of sides of the base.

12. The battery housing unit of claim 11, wherein the cover further comprises a tab along one side of the plurality of sides of the cover, and an opening at an opposite side of the plurality of sides of the cover, the tab fitting into the groove of the base and the flexible button of the base fitting into the opening of the cover when the cover is fitted over the base.

13. The battery housing unit of claim 6, wherein the base and cover are comprised of plastic materials.

14. The battery housing unit of claim 6, wherein the base and cover are comprised of different materials, at least one of which is plastic.

15. The battery housing unit of claim 6, wherein the retention members are comprised of plastic materials.

16. The battery housing unit of claim 15, wherein the retention members are comprised of at least one of plastic and spring steel.

17. The battery housing unit of claim 15, wherein the retention members are integrally molded with the base.

18. The battery housing unit of claim 15, wherein the retention members are separately attached to the base.

19. The battery housing unit of claim 1, wherein the stop ribs are integrally molded with the cover.

20. The battery housing unit of claim 1, wherein the stop ribs are separately attached to the cover.

21. The battery housing unit of claim 4, further comprising a cavity provided on each stop rib, wherein each of the detents engages a corresponding cavity to retain the battery between the flexible retention members when the cover is fitted to the base.

* * * * *